(12) United States Patent
Kang et al.

(10) Patent No.: US 12,266,805 B2
(45) Date of Patent: Apr. 1, 2025

(54) POUCH CASE FOR SECONDARY BATTERY, SECONDARY BATTERY HAVING SAME, SECONDARY BATTERY MODULE, AND METHOD OF MANUFACTURING SECONDARY BATTERY

(71) Applicant: SK On Co., Ltd., Seoul (KR)

(72) Inventors: Hee Gyoung Kang, Daejeon (KR); Tae Il Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 905 days.

(21) Appl. No.: 17/360,454

(22) Filed: Jun. 28, 2021

(65) Prior Publication Data

US 2022/0021054 A1    Jan. 20, 2022

(30) Foreign Application Priority Data

Jul. 14, 2020    (KR) .......................... 10-2020-0087110

(51) Int. Cl.
*H01M 50/105* (2021.01)
*H01M 10/613* (2014.01)
(Continued)

(52) U.S. Cl.
CPC ....... *H01M 50/105* (2021.01); *H01M 10/613* (2015.04); *H01M 10/6554* (2015.04); *H01M 50/211* (2021.01)

(58) Field of Classification Search
None
See application file for complete search history.

(56) References Cited

U.S. PATENT DOCUMENTS

2009/0311592 A1* 12/2009 You ................... H01M 10/0436
429/162
2015/0037648 A1* 2/2015 Nguyen ............. H01M 10/613
429/120
(Continued)

FOREIGN PATENT DOCUMENTS

EP    3321991 A1    5/2018
EP    3561899 A1    10/2019
(Continued)

OTHER PUBLICATIONS

EP21180425.7 European Search Report dated Dec. 14, 2021, 9 pgs.
Office Action for Korean Patent Application No. 10-2020-0087110 issued by the Korean Patent Office on Aug. 16, 2024.

*Primary Examiner* — Helen Oi K Conley
*Assistant Examiner* — Amanda Rosenbaum
(74) *Attorney, Agent, or Firm* — IP & T GROUP LLP

(57) ABSTRACT

A pouch case is provided which includes: a forming portion having a predetermined depth, and allowing each of a first end surface and a second end surface of the electrode assembly to be received therein; a notch portion extending from each of opposite ends of the forming portion so as to have a depth gradually decreasing from a depth defined by the thickness of the electrode assembly received in the forming portion; and a storing portion covering a remaining portion other than a portion of the electrode assembly received in the forming portion. By effectively controlling a protruding structure of the pouch case sealed on the first and second end surfaces of the electrode assembly received therein, it is possible to improve contact reliability between the stacked battery cells.

12 Claims, 23 Drawing Sheets

(51) Int. Cl.
*H01M 10/6554* (2014.01)
*H01M 50/211* (2021.01)

(56) References Cited

U.S. PATENT DOCUMENTS

| | | | | |
|---|---|---|---|---|
| 2019/0044106 A1* | 2/2019 | Kwon | .................. | H01M 50/119 |
| 2020/0365836 A1* | 11/2020 | Jung | .................. | H01M 50/548 |
| 2021/0257695 A1* | 8/2021 | Kim | .................. | H01M 50/136 |

FOREIGN PATENT DOCUMENTS

| | | | |
|---|---|---|---|
| JP | 2004-071301 | A | 3/2004 |
| KR | 20120051424 | A | 5/2012 |
| KR | 20170069980 | A | 6/2017 |
| KR | 101801232 | B1 | 11/2017 |
| KR | 20180029856 | A | 3/2018 |
| KR | 20180123901 | A | 11/2018 |
| KR | 101927262 | B1 | 12/2018 |
| KR | 20190010434 | A | 1/2019 |
| KR | 102061664 | B1 | 1/2020 |
| KR | 102064460 | B1 | 1/2020 |

* cited by examiner

POUCH CASE FOR SECONDARY BATTERY, SECONDARY BATTERY HAVING SAME, SECONDARY BATTERY MODULE, AND METHOD OF MANUFACTURING SECONDARY BATTERY

CROSS REFERENCE TO RELATED APPLICATION

The present application claims priority to Korean Patent Application No. 10-2020-0087110, filed Jul. 14, 2020, the entire contents of which is incorporated herein for all purposes by this reference.

BACKGROUND OF THE INVENTION

Field

An embodiment of the present disclosure relates to a pouch case for a secondary battery, a secondary battery, a secondary battery module, and a method of manufacturing the secondary battery.

Description of the Related Art

A secondary battery cell is made in a form in which an electrode assembly composed of a positive electrode, a negative electrode, a separator, and an electrolyte is enclosed in an exterior case. The electrode assembly may be classified into a jelly-roll type in which sheet-shaped positive and negative electrodes with active materials coated are wound with a separator interposed therebetween, and a stack type in which a plurality of positive and negative electrodes are sequentially stacked with a separator interposed therebetween. The electrode assembly is packaged in a container formed by pressing a metal material into a cylinder or a rectangular parallelepiped, or a pouch made of a multilayer film obtained by extrusion-molding a polymer raw material. Of these, pouch-type batteries are widely used in various fields due to their low manufacturing cost, low weight, and high moldability.

An example of a conventional pouch-type secondary battery includes an electrode assembly and a pouch case for sealing the electrode assembly. The pouch case includes a storing portion for storing the electrode assembly therein and a sealing portion for sealing the electrode assembly.

The conventional pouch-type secondary battery is manufactured by sealing the outer periphery of the pouch case after storing the electrode assembly in the storing portion of the pouch case, and then sealing a side of the pouch case to form a planar side. The secondary battery enclosed in the pouch case on three sides thereof as such is problematic in that sealing protrusions called shark fins formed at opposite ends of the planar side causes unnecessary interference to occur when a secondary battery module and a cooling plate come into contact, which reduces the cooling efficiency of the secondary battery module or causes restrictions on the degree of freedom of design to cope with various other environments. Accordingly, there is a need for a solution to this problem.

The foregoing is intended merely to aid in the understanding of the background of the present disclosure, and is not intended to mean that the present disclosure falls within the purview of the related art that is already known to those skilled in the art.

Documents of Related Art (Patent document 1) Korean Patent No. 10-2061664 B1

SUMMARY OF THE INVENTION

Accordingly, the present disclosure has been made keeping in mind the above problems occurring in the related art, and an objective of the present disclosure is to provide a pouch case for receiving an electrode assembly therein, and to provide a pouch case for effectively controlling unnecessary structural protrusions occurring in a process of receiving and sealing the electrode assembly.

Another objective of the present disclosure is to provide a pouch case for allowing a first end surface and a second end surface of an electrode assembly to make intimate contact with the pouch case without loosening therefrom, and preventing structural separation of the electrode assembly.

Still another objective of the present disclosure is to provide a secondary battery and a secondary battery module, wherein not only a structural space for stacking and cooling of the secondary battery in which an electrode assembly is received in a pouch case is optimized, but also a contact surface with a cooling plate for cooling is effectively secured.

Still another objective of the present disclosure is to provide a method of manufacturing a secondary battery having a pouch case.

In order to achieve the above objectives, according to one aspect of the present disclosure, there is provided a pouch case for a secondary battery, the pouch case including: a forming portion having a predetermined depth, and allowing each of a first end surface and a second end surface of an electrode assembly to be received therein; a notch portion extending from each of opposite ends of the forming portion; and a storing portion covering a portion of the electrode assembly that is not received in the forming portion, wherein the forming portion may include: a first forming portion allowing the first end surface of the electrode assembly to be received therein; and a second forming portion allowing the second end surface of the electrode assembly to be received therein.

Here, the first forming portion may include: a first bottom surface having a predetermined depth and with which the first end surface of the electrode assembly comes into contact; and a first height portion extending from the first bottom surface to support each of opposite side surfaces of the electrode assembly, and the second forming portion may include: a second bottom surface having a predetermined depth and with which the second end surface of the electrode assembly comes into contact; and a second height portion extending from the second bottom surface to support each of the opposite side surfaces of the electrode assembly.

Furthermore, each of extension lines of the first bottom surface and the second bottom surface and an associated one of the respective notch portions may form an acute angle.

Furthermore, the notch portion may include: a first notch portion extending upwardly at a predetermined angle from each of opposite ends of the first forming portion; and a second notch portion extending upwardly at a predetermined angle from each of opposite ends of the second forming portion.

Furthermore, the storing portion may include: a central storing portion covering a first side surface of the electrode assembly between the first forming portion and the second forming portion; a first storing portion including a first receiving portion covering a portion of a second side surface of the electrode assembly and a first junction portion extending from an end of the first receiving portion so as to be bendable; and a second storing portion including a second receiving portion covering a remaining portion of the second side surface of the electrode assembly and a second junction portion extending from an end of the second receiving portion so as to be bendable.

Furthermore, the first junction portion may extend upwardly from the first receiving portion so as to have a height difference with respect to the first receiving portion, and the second junction portion may extend upwardly from the second receiving portion so as to have a height difference with respect to the second receiving portion.

Furthermore, the pouch case may further include: a first pressing protrusion protruding inwardly from the first bottom surface to support the first end surface of the electrode assembly; and a second pressing protrusion protruding inwardly from the second bottom surface to support the second end surface of the electrode assembly.

According to another aspect of the present disclosure, there is provided a pouch case for a secondary battery, the pouch case including: a forming portion having a predetermined depth, and allowing each of a first end surface and a second end surface of an electrode assembly to be received therein; a notch portion spaced apart from each of opposite ends of the forming portion; and a storing portion covering a portion of the electrode assembly that is not received in the forming portion, wherein the forming portion may include: a first forming portion allowing the first end surface of the electrode assembly to be received therein; and a second forming portion allowing the second end surface of the electrode assembly to be received therein.

Here, the first forming portion may include: a first bottom surface having a predetermined depth and with which the first end surface of the electrode assembly comes into contact; and a first height portion extending from the first bottom surface to support each of opposite side surfaces of the electrode assembly, and the second forming portion may include: a second bottom surface having a predetermined depth and with which the second end surface of the electrode assembly comes into contact; and a second height portion extending from the second bottom surface to support each of the opposite side surfaces of the electrode assembly.

Furthermore, the notch portion may include: a first notch portion having a height difference with respect to the first bottom surface of the first forming portion, and a second notch portion having a height difference with respect to the second bottom surface of the second forming portion.

Furthermore, the notch portion may include: a first notch portion spaced apart from each of opposite ends of the first forming portion, and including a first curved surface having a predetermined curvature in a direction outwardly of the pouch case; and a second notch portion spaced apart from each of opposite ends of the second forming portion, and including a second curved surface having a predetermined curvature in a direction outwardly of the pouch case.

Furthermore, the storing portion may include: a central storing portion covering a first side surface of the electrode assembly between the first forming portion and the second forming portion; a first storing portion including a first receiving portion covering a portion of a second side surface of the electrode assembly and a first junction portion extending from an end of the first receiving portion so as to be bendable; and a second storing portion including a second receiving portion covering a remaining portion of the second side surface of the electrode assembly and a second junction portion extending from an end of the second receiving portion so as to be bendable.

Furthermore, the pouch case may further include: a first pressing protrusion protruding inwardly from the first bottom surface to support the first end surface of the electrode assembly; and a second pressing protrusion protruding inwardly from the second bottom surface to support the second end surface of the electrode assembly.

According to still another aspect of the present disclosure, there is provided a secondary battery, including: an electrode assembly; and a pouch case receiving the electrode assembly therein, wherein the pouch case may include: a forming portion having a predetermined depth, and including a first forming portion allowing a first end surface of the electrode assembly to be received therein and a second forming portion allowing a second end surface of the electrode assembly to be received therein; a notch portion extending from each of opposite ends of the forming portion or spaced apart from each of the opposite ends of the forming portion; and a storing portion covering a portion of the electrode assembly that is not received in the forming portion.

Here, the storing portion may include: a central storing portion covering a first side surface of the electrode assembly between the first forming portion and the second forming portion; a first storing portion including a first receiving portion covering a portion of a second side surface of the electrode assembly and a first junction portion extending from an end of the first receiving portion and bent outwardly of the electrode assembly; and a second storing portion including a second receiving portion covering a remaining portion of the second side surface of the electrode assembly and a second junction portion extending from an end of the second receiving portion and bent outwardly of the electrode assembly.

Furthermore, the first junction portion and the second junction portion may be bent outwardly of the second side surface of the electrode assembly in surface contact with each other.

According to still another aspect of the present disclosure, there is provided a secondary battery module, including: at least two secondary batteries stacked in a first side surface direction, wherein the secondary batteries may be arranged to be spaced apart from each other at a predetermined interval, and each of the secondary batteries may include: an electrode assembly; and a pouch case receiving the electrode assembly therein, wherein the pouch case may include: a forming portion having a predetermined depth, and including a first forming portion allowing a first end surface of the electrode assembly to be received therein and a second forming portion allowing a second end surface of the electrode assembly to be received therein; a notch portion extending from each of opposite ends of the forming portion or spaced apart from each of the opposite ends of the forming portion; and a storing portion covering a portion of the electrode assembly that is not received in the forming portion.

Here, the secondary battery module may further include: a cooling plate disposed on the first forming portion or the second forming portion of each of the secondary batteries.

Furthermore, the cooling plate may include: a first cooling plate coming into surface contact with the first forming portion; and a second cooling plate coming into surface contact with the second forming portion.

Furthermore, the secondary battery module may further include: an insulating material provided in the predetermined interval.

According to still another aspect of the present disclosure, there is provided a method of manufacturing a secondary battery, the method including: forming a first forming portion and a second forming portion in a pouch case so as to be spaced apart from each other; coupling a first end surface of an electrode assembly to the first forming portion; coupling a central storing portion between the first forming portion and the second forming portion to a first side surface of the electrode assembly so as to cover the first side surface of the electrode assembly by the central storing portion; coupling a second end surface of the electrode assembly to the second forming portion; and coupling a second storing portion extending from the second forming portion to a portion of a second side surface of the electrode assembly so as to cover the portion of the second side surface of the electrode assembly by the second storing portion, and coupling a first storing portion extending from the first forming portion to a remaining portion of the second side surface of the electrode assembly so as to cover the remaining portion of the second side surface of the electrode assembly by the first receiving portion.

Here, the method may further include: after the coupling of the first storing portion to the portion of the second side surface of the electrode assembly and the coupling of the second storing portion to the remaining portion of the second side surface of the electrode assembly, joining a first bendable junction portion at an end of the first receiving portion and a second bendable junction portion at an end of the second receiving portion to each other; and bending a sealing joint in one direction on the second side surface of the electrode assembly, the sealing joint resulting from the joining of the first junction portion and the second junction portion.

Furthermore, the forming of the first forming portion and the second forming portion in the pouch case so as to be spaced apart from each other may include: forming a first notch portion extending from each of opposite ends of the first forming portion in one direction in which the first forming portion is formed, and a second notch portion extending from each of opposite ends of the second forming portion in one direction in which the second forming portion is formed.

Furthermore, the forming of the first forming portion and the second forming portion in the pouch case so as to be spaced apart from each other may include: forming a first notch portion spaced apart from each of opposite ends of the first forming portion in one direction in which the first forming portion is formed, and a second notch portion spaced apart from each of opposite ends of the second forming portion in one direction in which the second forming portion is formed.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, by effectively controlling a protruding structure of the pouch case sealed on the first and second end surfaces of the electrode assembly received therein, it is possible to improve contact reliability between a stacked structure of a pouch-type secondary battery and the cooling plate.

In addition, by effectively controlling protruding of the sealing portion on each of opposite ends of the pouch-type secondary battery, while simultaneously covering the first and second end surfaces of the electrode assembly, it is possible to effectively secure a contact surface with the cooling plate on the opposite ends of the pouch-type secondary battery. Thereby, it is possible to improve the cooling efficiency of the secondary battery module and a battery pack having the same and the degree of freedom of design of the cooling structure.

In addition, in order to effectively reduce and control coupling errors or tolerances that may occur in the process of receiving and sealing the electrode assembly in the pouch case, by physically supporting and pressing the opposite upper and lower end surfaces of the electrode assembly through the pressing protrusions partially protruding from the bottom surface of the forming portions of the pouch case, it is possible to prevent the electrode assembly from loosening when it is received in the pouch case, thereby securing reliability when the electrode assembly is received in the pouch case and sealed.

In addition, by effectively removing and controlling a protruding structure of the sealing joint that may occur in the process of sealing the electrode assembly by the pouch case, it is possible not only to further improve the energy density of the secondary battery module configuration, but also to increase the degree of freedom of design for realizing various stacked structures.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
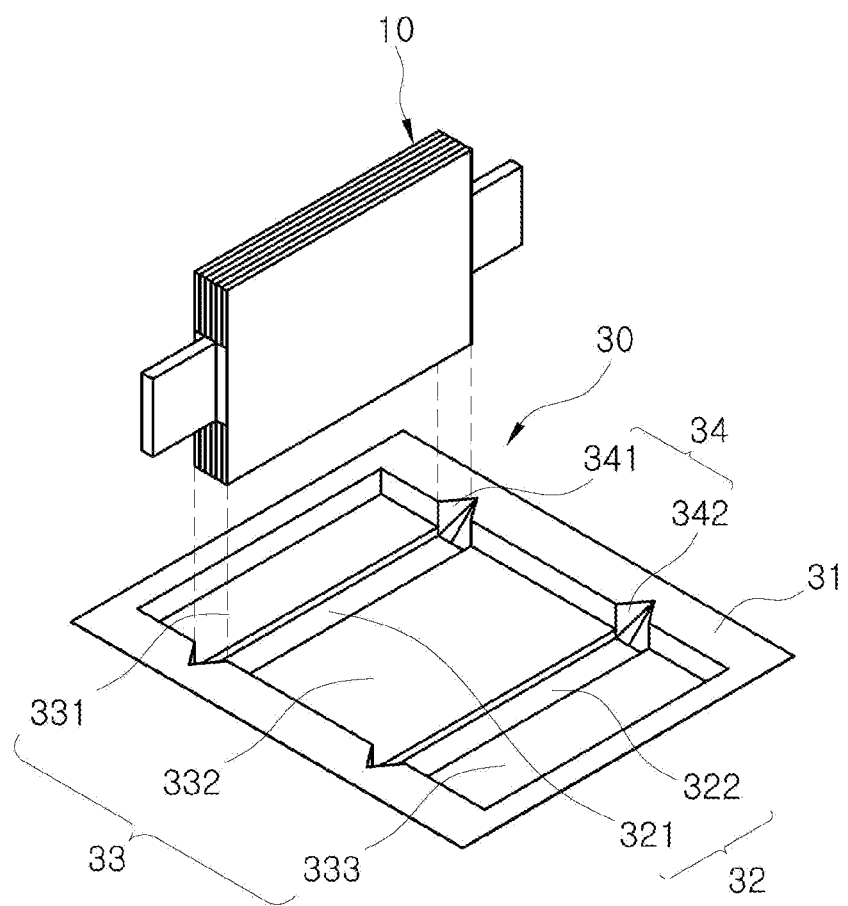
FIG. 1 is an exploded perspective view of a pouch case according to an embodiment of the present disclosure and an electrode assembly.

The above and other objectives, features, and other advantages of the present disclosure will be more clearly understood from the following detailed description and preferable embodiments when taken in conjunction with the accompanying drawings. As for reference numerals associated with parts in the drawings, the same reference numerals will refer to the same or like parts throughout the drawings. Further, it will be understood that, although the terms "first surface", "second surface", "first", "second", etc. may be used only to distinguish one element from another element, these elements should not be limited by these terms. In the following description, details of well-known features and techniques may be omitted to avoid unnecessarily obscuring the present disclosure.

Hereinbelow, exemplary embodiments of the present disclosure will be described in detail with reference to the accompanying drawings. Throughout the drawings, the same reference numerals will refer to the same or like parts.

Figure 2:
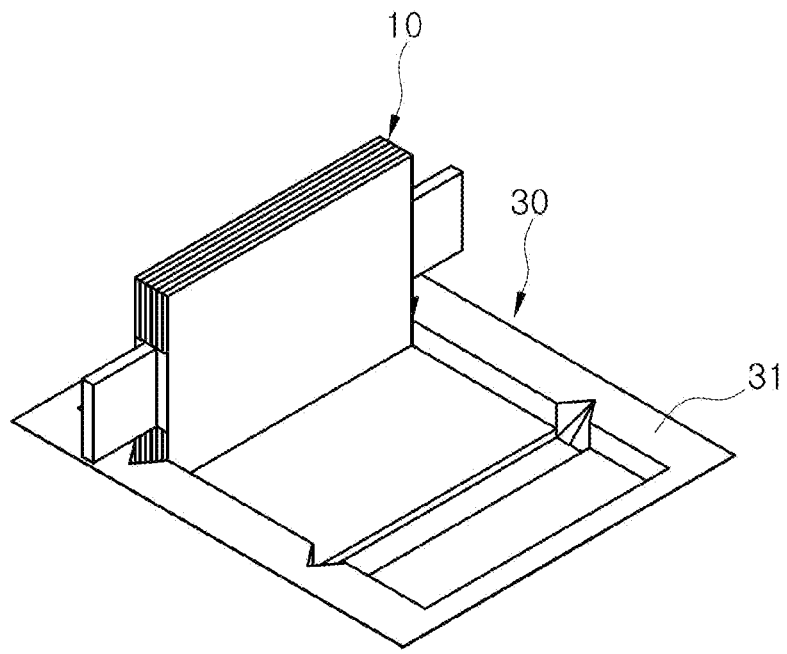
FIG. 2 is an assembled perspective view of the pouch case according to the embodiment of the present disclosure and the electrode assembly.
Figure 3:
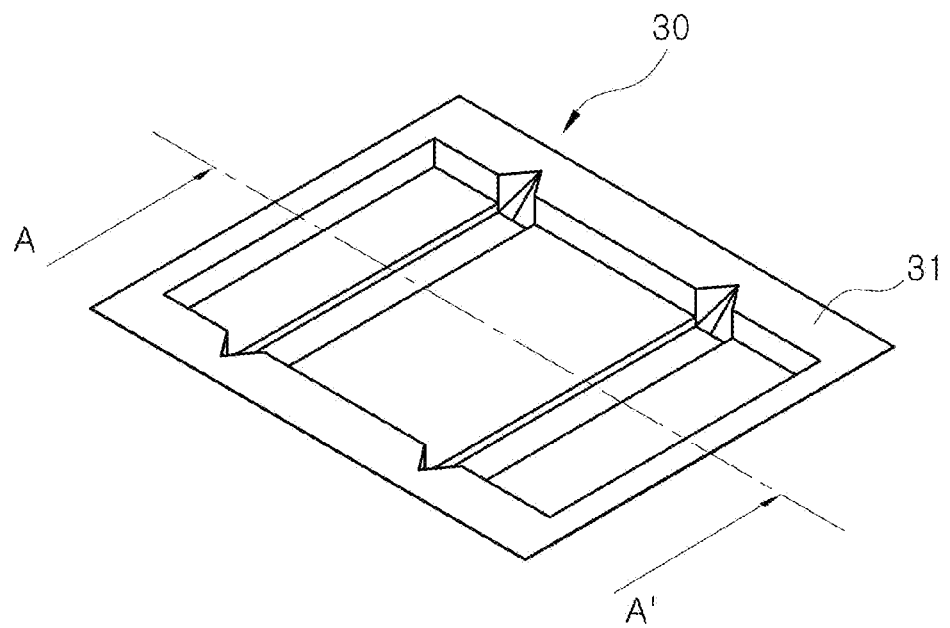
FIG. 3 is a perspective view of the pouch case according to the embodiment of the present disclosure.
Figure 4:
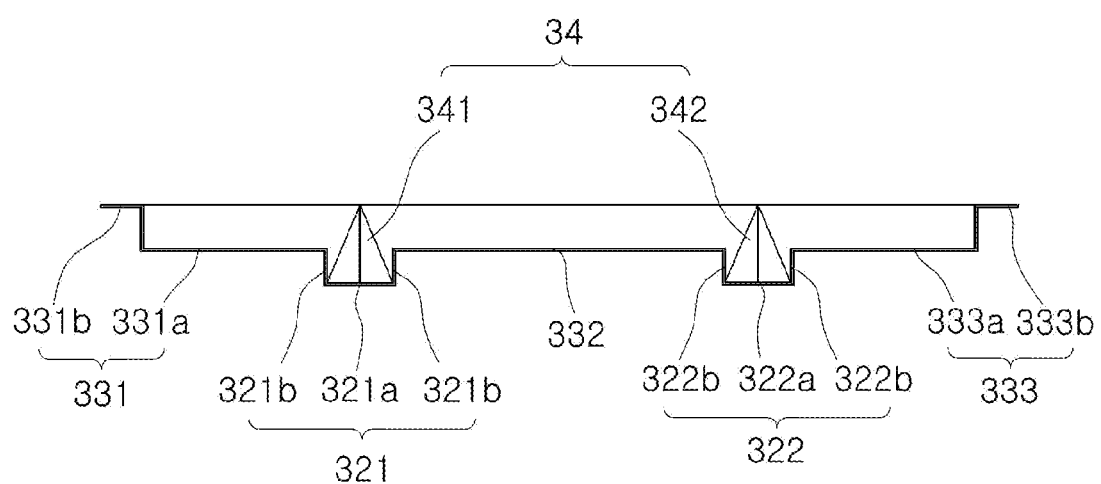
FIG. 4 is a sectional view taken along A-A' of FIG. 3.
Figure 5:
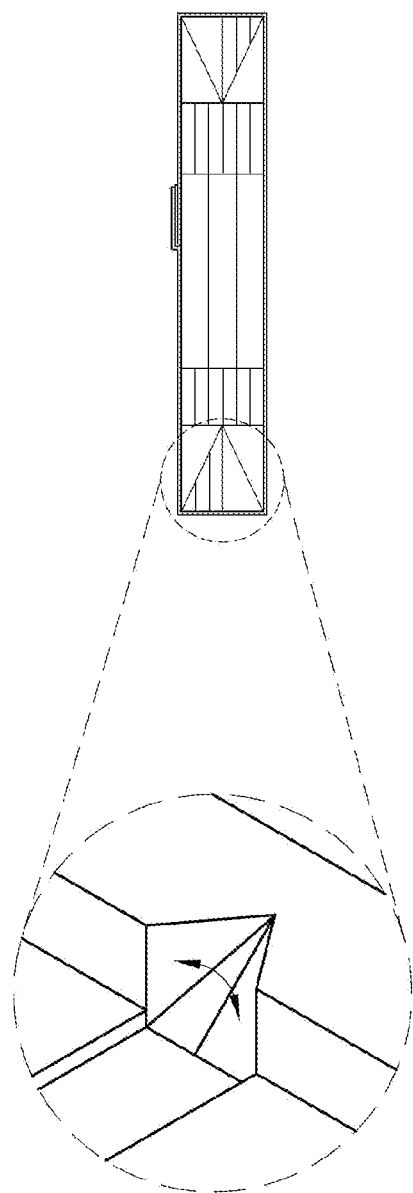
FIG. 5 is a sectional view of a secondary battery having a pouch case according to an embodiment of the present disclosure.
Figure 6A:
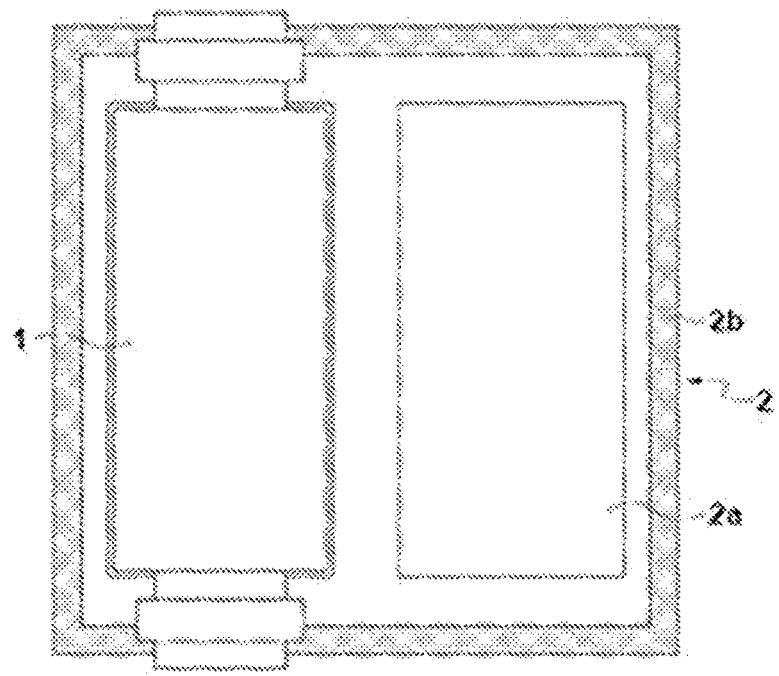
FIGS. 6A and 6B are views of a conventional pouch-type secondary battery.
Figure 6B:
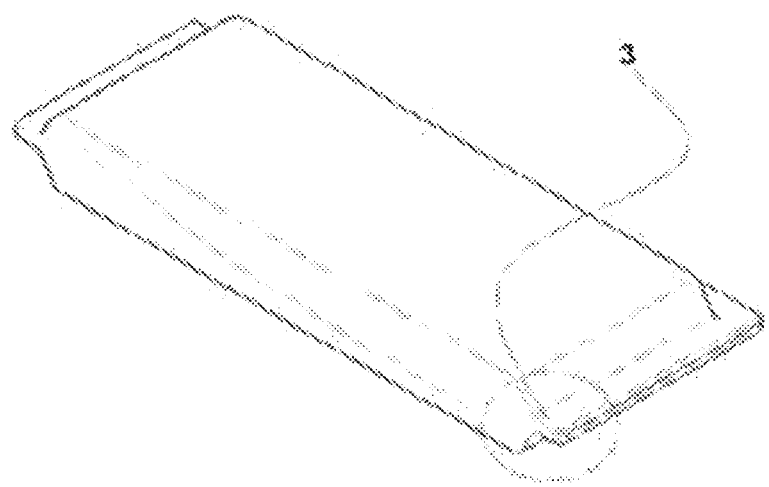
Figure 7:
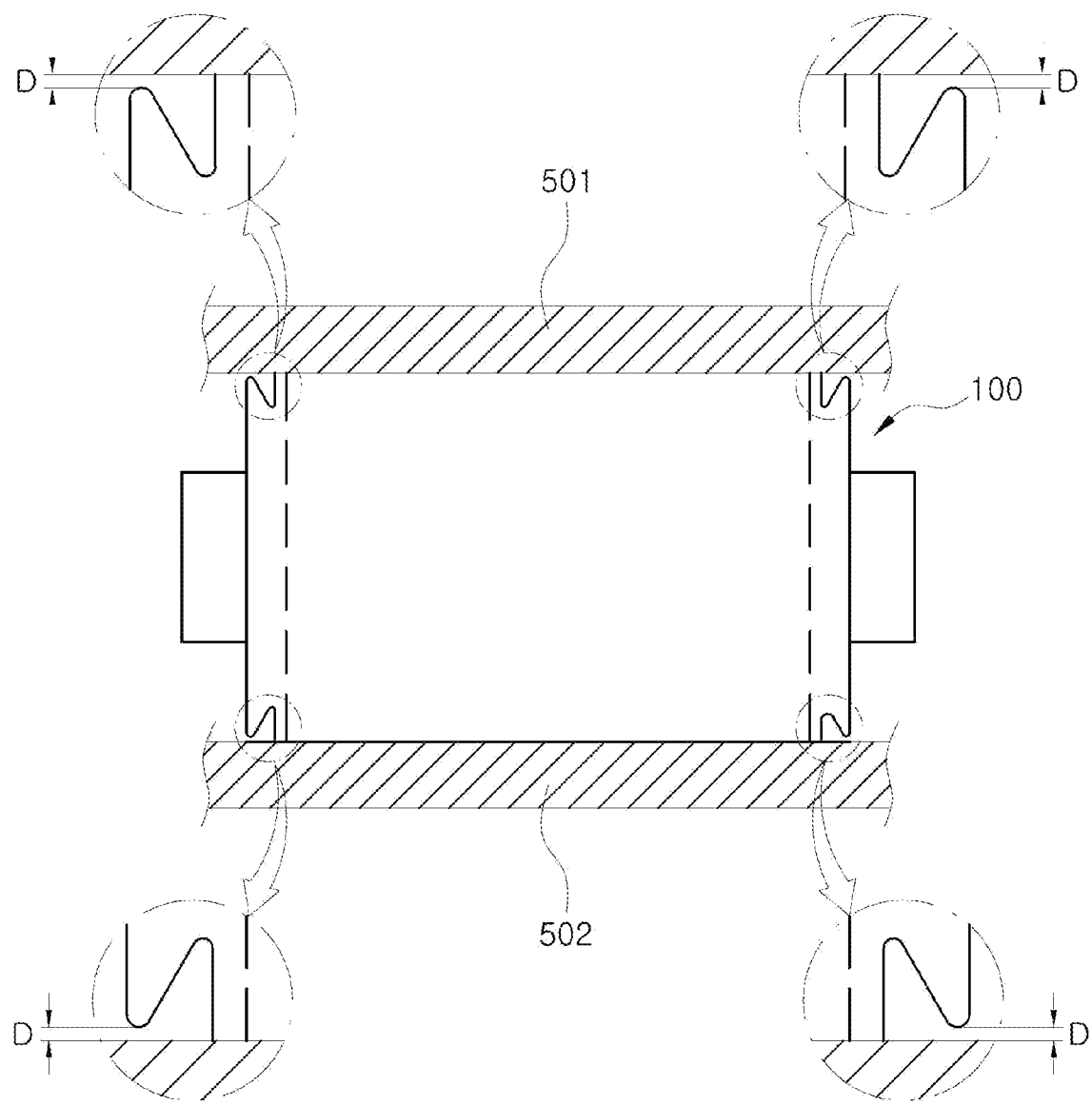
FIG. 7 is a plan view of the secondary battery having the pouch case according to the embodiment of the present disclosure, in which the electrode assembly is received.
Figure 8A:
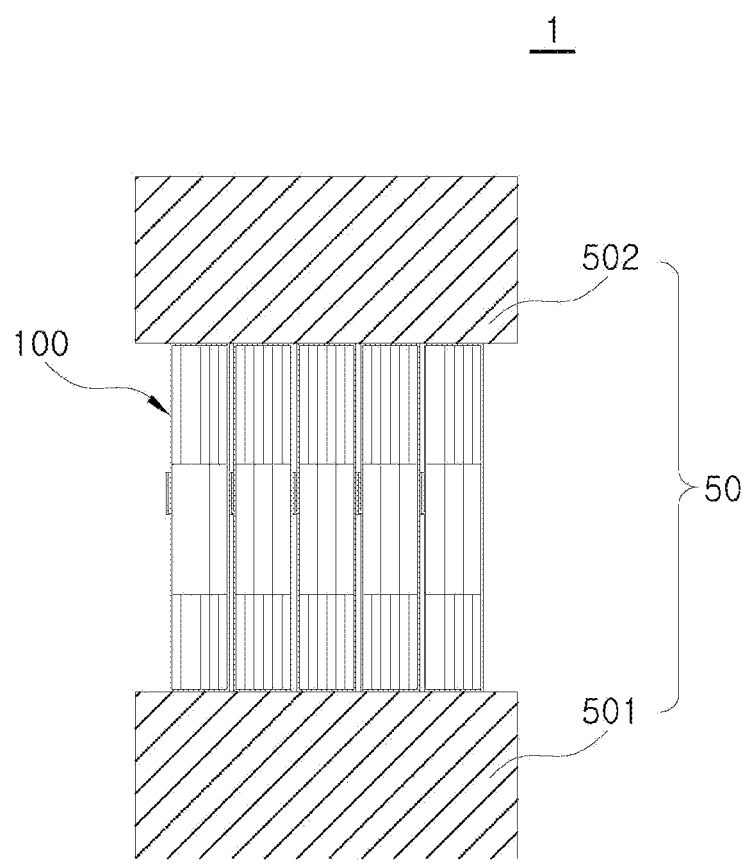
FIGS. 8A and 8B are schematic views of coupling of secondary batteries to a cooling plate of a secondary battery module according to an embodiment of the present disclosure.
Figure 8B:
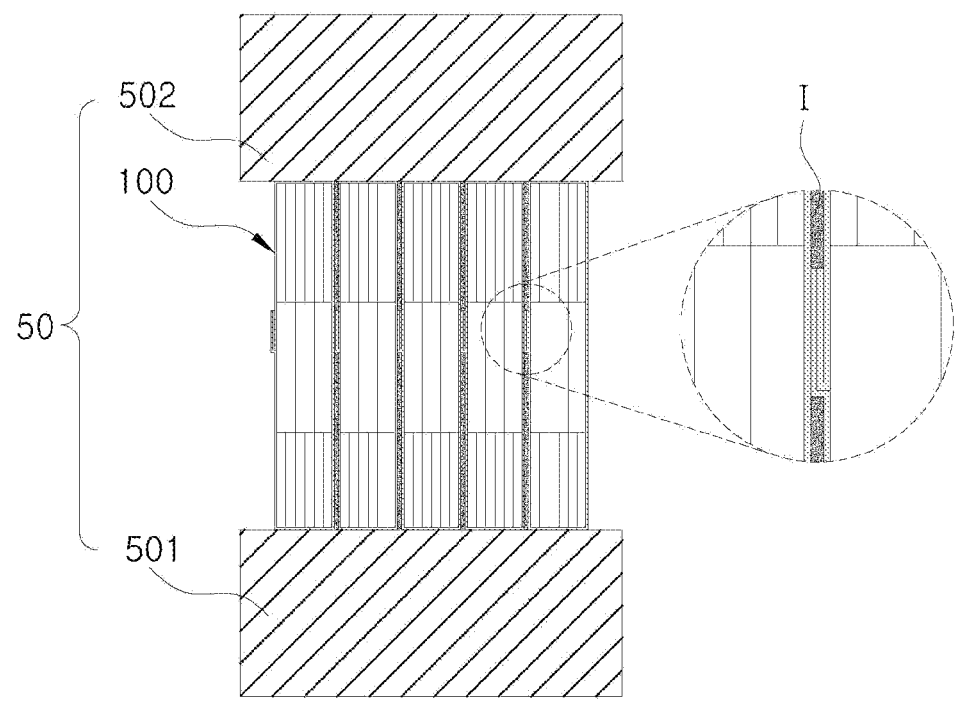

FIG. 1 is an exploded perspective view of a pouch case according to an embodiment of the present disclosure and an electrode assembly; FIG. 2 is an assembled perspective view of the pouch case according to the embodiment of the present disclosure and the electrode assembly; FIG. 3 is a perspective view of the pouch case according to the embodiment of the present disclosure; FIG. 4 is a sectional view taken along A-A' of FIG. 3; FIG. 5 is a sectional view of a secondary battery having a pouch case according to an embodiment of the present disclosure; FIGS. 6A and 6B are views of a conventional pouch-type secondary battery; FIG. 7 is a plan view of the secondary battery having the pouch case according to the embodiment of the present disclosure, in which the electrode assembly is received; and FIGS. 8A and 8B are schematic views of coupling of secondary batteries to a cooling plate of a secondary battery module according to an embodiment of the present disclosure.

The pouch case 30 according to the embodiment of the present disclosure includes: a forming portion 32 having a predetermined depth, and allowing each of a first end surface and a second end surface of the electrode assembly 10 to be received therein; a notch portion 34 extending from each of opposite ends of the forming portion 30 so as to have a depth gradually decreasing from a depth defined by the thickness of the electrode assembly 10 received in the forming portion 32; and a storing portion 33 covering a remaining portion other than a portion of the electrode assembly 10 received in the forming portion 32.

As illustrated in FIGS. 1 and 2, the pouch case 30 according to the embodiment of the present disclosure is characterized in that the forming portion 32 includes a first forming portion 321 and a second forming portion 322 respectively coupled to the first end surface and the second end surface (upper end surface and lower end surface in the drawing) of the electrode assembly 10, and the notch portion 34 includes a first notch portion 341 and a second notch portion 342 respectively formed at each of longitudinal opposite ends of the first forming portion 321 and each of longitudinal opposite ends of the second forming portion 321, thereby minimizing protrusion or structural deformation due to unnecessary sealing joints on the first end surface and the second end surface, i.e., the upper end surface and lower end surface, of the electrode assembly 10 sealed by the first and second forming portions 321 and 322.

As illustrated in FIGS. 3 and 4, the pouch case 30 according to the embodiment of the present disclosure is configured such that the first forming portion 321 and the second forming portion 322 are spaced apart from each other in the lateral direction so that the first end surface of the electrode assembly 10 and the second end surface thereof opposite to the first end surface are fixedly coupled to respective predetermined positions inside the sealing portion 31 formed along the outer periphery of the pouch case 30.

The first forming portion 321 is formed in one direction at a side of an inner space defined inside the sealing portion 31 of the pouch case 30 so as to allow the first end surface of the electrode assembly 10 to be positioned therein. Opposite sides of the first forming portion 321 may be bent upwardly at a predetermined angle to form a predetermined position so that the first end surface of the electrode assembly 10 may be fixed or the position thereof is determined.

In the embodiment of the present disclosure, as illustrated in FIGS. 3 and 4, the first forming portion 321 may include a first bottom surface 321a allowing a portion of the first end portion of the electrode assembly 10 to be received thereon, and a first height portion 321b extending upwardly from each of opposite sides of the first bottom surface 321a so as to support each of opposite side surface of the electrode assembly 10.

The second forming portion 322 is a configuration that allows the second end surface of the electrode assembly 10 opposite to the first end surface thereof to be received and coupled thereinto, and may have the same shape and structure as the first forming portion 321 described above. In addition, since the first forming portion 321 and the second forming portion 322 are coupled to the first end surface and the second end surface of the electrode assembly 10 so as to fix and receive the same at respective corresponding positions, the first forming portion 321 and the second forming portion 322 may be configured to have the same structures and shapes, which may be effective in receiving the electrode assembly 10 in the pouch case 30.

The storing portion 33 includes a first storing portion 331, a central storing portion 332, and a second storing portion 333 sequentially formed with respect to the first forming portion 321 and the second forming portion 322 of the pouch case 30. The storing portion 33 covers opposite side surfaces of the electrode assembly 10, and is finally sealed while surrounding the side surfaces of the electrode assembly 10 to allow the electrode assembly 10 to be received in the pouch case 30.

The central storing portion 332 between the first forming portion 321 and the second forming portion 322 completely receives and covers a first side surface of the electrode assembly 10, and the first storing portion 331 and the second storing portion 333 at positions outside the first forming portion 321 and the second forming portion 322 overlap each other on a second side surface of the electrode assembly 10 to be sealed and joined together.

As illustrated in FIG. 4, the first storing portion 331 includes a first receiving portion 331a covering a portion of the second side surface of the electrode assembly 10, and a first junction portion 331b extending from the first storing portion 331 so as to be bendable and used for final sealing and joining. Here, the first receiving portion 331a may be configured to have a height difference with respect to the first junction portion 331b so as to have an inner space in order to facilitate assembly when covering the electrode assembly 10 or to flexibly respond to the shape of the electrode assembly 10. When the first receiving portion 331a naturally covers the portion of the second side surface of the electrode assembly 10, the first junction portion 331b may be bent outwardly of the second side surface of the electrode assembly 10 and finally joined to a second junction portion 333b of the second storing portion 333 so as to face the second junction portion 333b in a surface contact manner, thereby sealing the pouch case 30.

The second storing portion 333 extends outwardly of the second forming portion 322, and covers a portion of the second side surface of the electrode assembly 10 when the second forming portion 322 receives the second end surface of the electrode assembly 10. The second storing portion 333 includes a second receiving portion 333a covering the portion of the second side surface of the electrode assembly 10 and the second junction portion 333b extending from the second receiving portion 333a so as to be bendable. The second junction portion 333b is joined to the above-described first junction portion 331b of the first storing portion 331 so as to face the first junction portion 331b in a surface contact manner, thereby sealing the pouch case 30.

As illustrated in FIG. 5, the first junction portion 331b and the second junction portion 333b may be bent outwardly of the second side surface of the electrode assembly 10 in surface contact with each other. According to an example, the first junction portion 331b and the second junction portion 333b may be joined to each other by a sealing method to form surface contact therebetween, but is not limited thereto. In the present disclosure, unnecessary lose space may be prevented by bending the first junction portion 331b and the second junction portion 333b in a direction outwardly of the second side surface of the electrode assembly 10.

The notch portion 34 may include the first notch portion 341 and the second notch portion 342 respectively formed at each of the longitudinal opposite ends of the first forming portion 321 and each of the longitudinal opposite ends of the second forming portion 322.

As illustrated in FIG. 1, the respective first notch portions 341 may be formed at the longitudinal opposite ends of the first forming portion 321, and the respective second notch portions 342 may be formed at the longitudinal opposite ends of the second forming portion 322.

As illustrated in FIGS. 6A and 6B, the conventional pouch-type secondary battery 10 includes an electrode assembly 1 and a pouch case 2 for sealing the electrode assembly 1. The pouch case 2 includes a storing portion 2a for storing the electrode assembly 1 therein and a sealing portion 2b for sealing the electrode assembly 1. In the case of coupling the conventional pouch-type secondary battery 10 to a cooling plate of a battery module, interference with the cooling plate is caused by a sealing protrusion 3 called a shark fin illustrated in FIG. 6B, which may cause a problem of deteriorating not only cooling efficiency but also energy density of the battery module.

However, as illustrated in FIG. 7, the second battery 100 having the pouch case 30 according to the embodiment of the present disclosure does not have a protrusion formed on a side surface of the pouch case 30, and thus enables, when coupled to the cooling plate 50 of the secondary battery module 1, which will be described later, to make surface contact therewith, thereby improving cooling efficiency.

In addition, by the provision of the notch portion 34 of the pouch case 30 described above, it is possible to control the shape and size of the sealing protrusion. Furthermore, by forming a predetermined clearance distance D from the cooling plate 50, it is possible to effectively secure a coupling surface with the cooling plate 50.

Specifically, the respective first notch portions 341 may be formed at the opposite ends of the first forming portion 321 by extending from opposite ends of the first bottom surface 321a of the first forming portion 321 to be inclined upwardly toward the sealing portion 31 of the pouch case 30. The first notch portions 341 are to cover longitudinal side surfaces of the electrode assembly 10 at positions on the opposite ends of the first forming portion 321 and allow the pouch case 30 to be folded efficiently, and are not limited in shape to those illustrated in the drawing. The first notch portions 341 may be configured in various lengths and directions to eliminate structural imbalances such as irregular protrusion or overlapping of the pouch case 30 caused by sealing on the longitudinal side surfaces of the electrode assembly 10. The second notch portion 342 also has the same configuration and effect as the first notch portion 341, and a detailed description thereof would be redundant and thus will be omitted.

As illustrated in FIG. 8A, by the provision of the forming portion 32, the secondary battery module 1 having the pouch case 30 according to the embodiment of the present disclosure enables the secondary batteries 100 to make surface contact with the cooling plate 50 on upper and lower surfaces thereof without undergoing interference therewith due to protruding of the pouch case 30, thereby improving cooling efficiency.

In addition, by the first and second junction portions 331b and 333b positioned on the second side surface in a direction outwardly of the electrode assembly 10, a space having a predetermined interval may be formed between stacked secondary batteries 100. That is, since the first junction portion 3311b and the second junction portion 333b may be bent outwardly of the second side surface of the electrode assembly 10 in surface contact therewith, the secondary batteries 100 may be stacked in a direction of the first side surface and arranged to be spaced apart from each other at the predetermined interval. This predetermined interval may serve as an appropriate buffer against deformation or expansion occurring in the stacking direction when the secondary batteries 100 are stacked.

As illustrated in FIG. 8B, this interval may be utilized for a cooling function by inflow and outflow of air or circulation of a refrigerant, or may be utilized as a space in which an insulating material I is charged to suppress thermal propagation.

Figure 9:
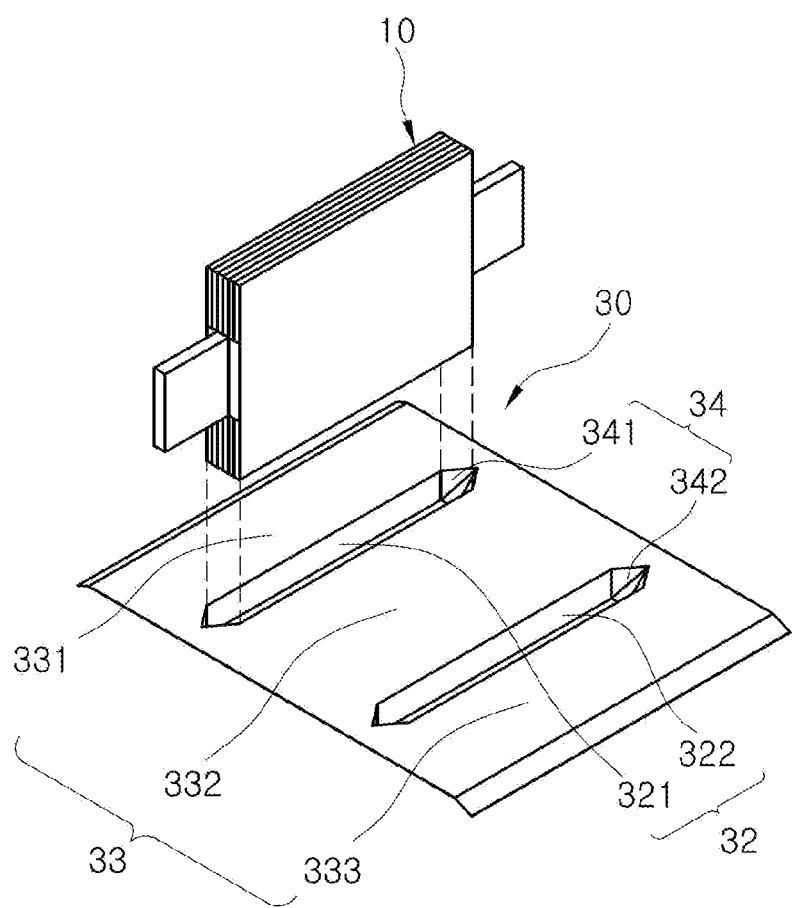
FIG. 9 is an exploded perspective view of a pouch case according to another embodiment of the present disclosure and an electrode assembly.
Figure 10:
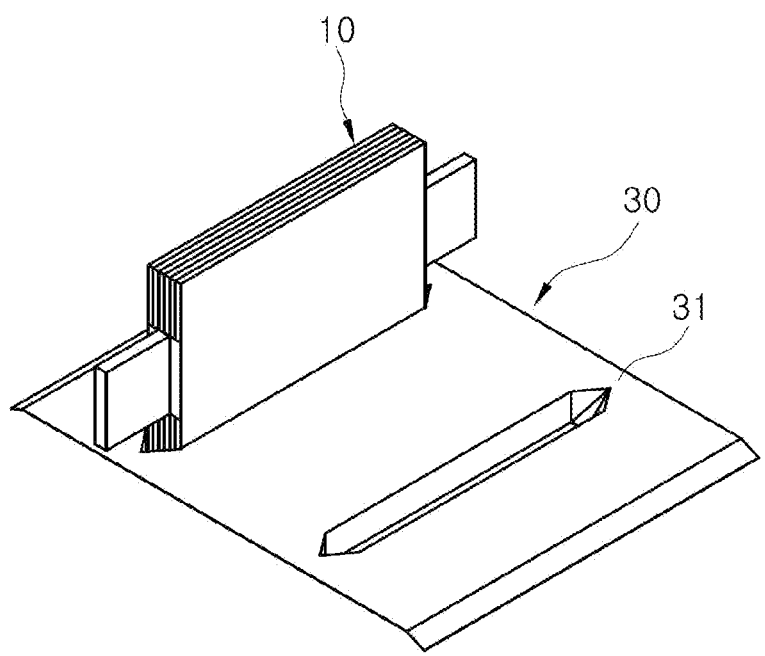
FIG. 10 is an assembled perspective view of the pouch case according to the other embodiment of the present disclosure and the electrode assembly.
Figure 11:
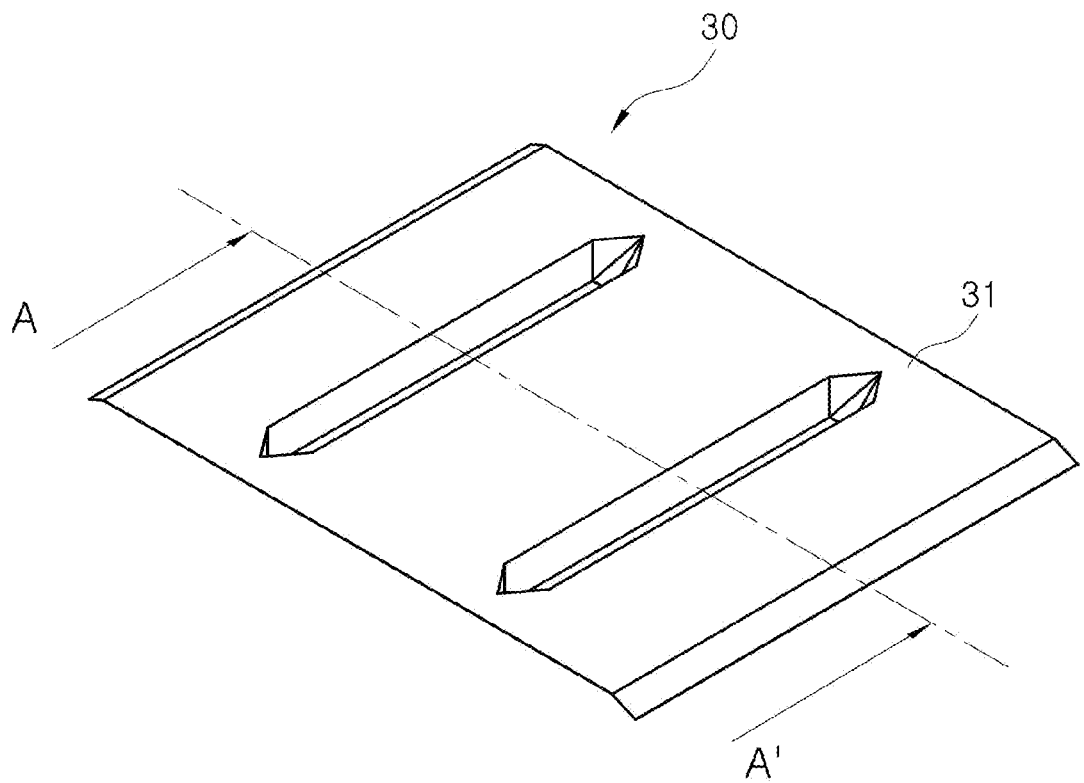
FIG. 11 is a perspective view of the pouch case according to the other embodiment of the present disclosure.
Figure 12:
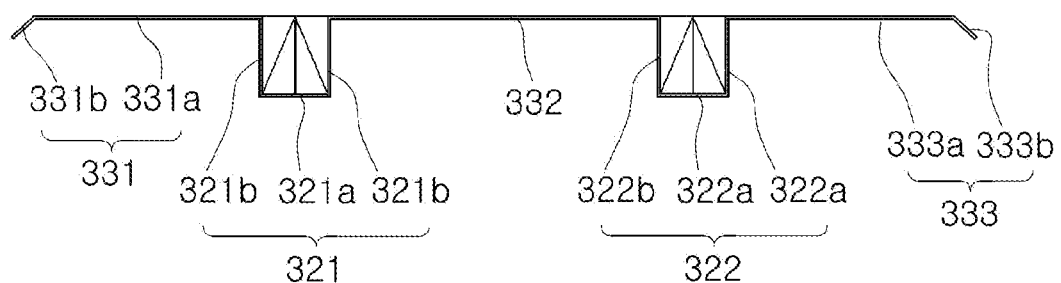
FIG. 12 is a sectional view taken along A-A' of FIG. 11.
Figure 13:
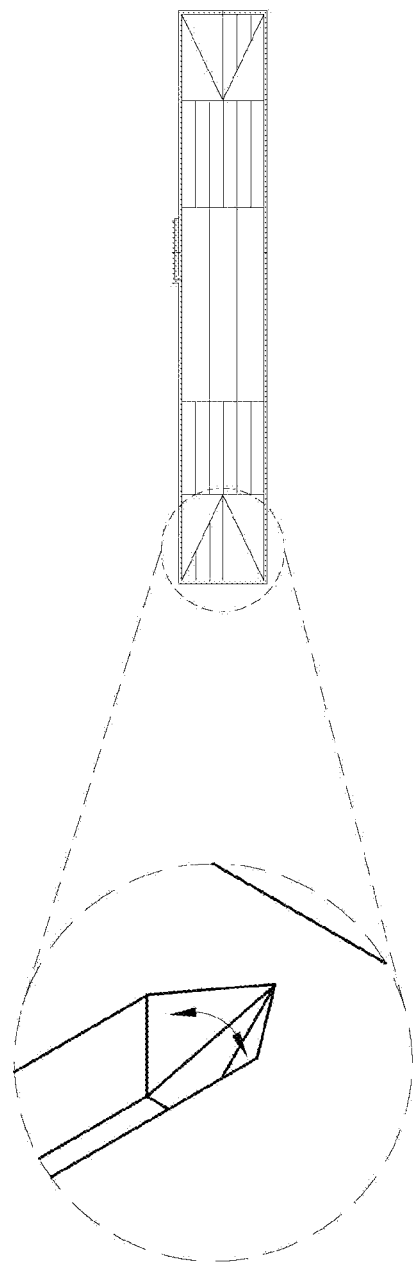
FIG. 13 is a sectional view of a secondary battery having a pouch case according to another embodiment of the present disclosure.

FIG. 9 is an exploded perspective view of a pouch case according to another embodiment of the present disclosure and an electrode assembly; FIG. 10 is an assembled perspective view of the pouch case according to the other embodiment of the present disclosure and the electrode assembly; FIG. 11 is a perspective view of the pouch case according to the other embodiment of the present disclosure; FIG. 12 is a sectional view taken along A-A' of FIG. 11; and FIG. 13 is a sectional view of a secondary battery having a pouch case according to another embodiment of the present disclosure.

As illustrated in FIGS. 9 and 10, the pouch case 30 according to the embodiment of the present disclosure includes a first forming portion 321, a second forming portion 322, a first notch portion 341, and a second notch portion 342, but the difference from the foregoing embodiment is that a storing portion 33 is disposed on the same plane with a sealing portion 31 on the outer periphery of the pouch case 30 without a height difference between the sealing portion 31 and an inner space.

As illustrated in FIGS. 11 and 12, the electrode assembly 10 is received in the pouch case 20, and the first forming portion 321, the second forming portion 322, the first notch portion 341, and the second notch portion 342 may be formed on the same plane without having a height difference with the sealing portion 31 on the outer periphery of the pouch case where sealing is performed, whereby a first storing portion 331, a central storing portion 332, and a second storing portion 333 may cover the electrode assembly 10 on the same plane.

A first junction portion 331b and a second junction portion 333b formed at opposite ends of the pouch case 30 may be finally joined and sealed on a second side surface of the electrode assembly 10 to form a sealing joint 31a, thereby facilitating sealing of the inside of the pouch case 30 in which the electrode assembly 10 is received.

As illustrated in FIG. 13, the first junction portion 331b and the second junction portion 333b may be joined to each other in surface contact with each other, while covering the electrode assembly 10 in opposite directions on the second side surface of the electrode assembly 10, so that the electrode assembly 10 may be received in the pouch case 30 and sealed. The junction portions 331b and 333b formed at the opposite ends of the pouch case 30 may be configured to be bendable, whereby the sealing joint 31a may be bent after final sealing, thereby effectively preventing damage to the pouch case 30. The effects and descriptions related thereto are redundant with the above descriptions described with reference to FIGS. 8A and 8B, so a detailed description thereof will be omitted.

Figure 14:
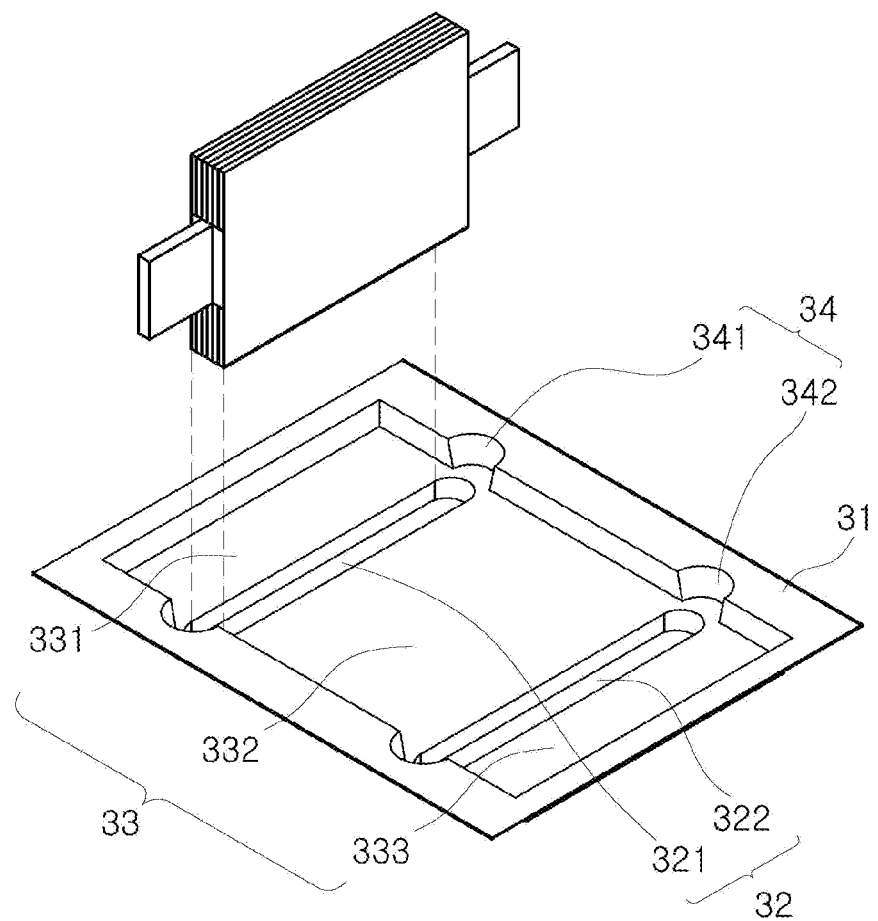
FIG. 14 is an exploded perspective view of a pouch case according to another embodiment of the present disclosure and an electrode assembly.
Figure 15:
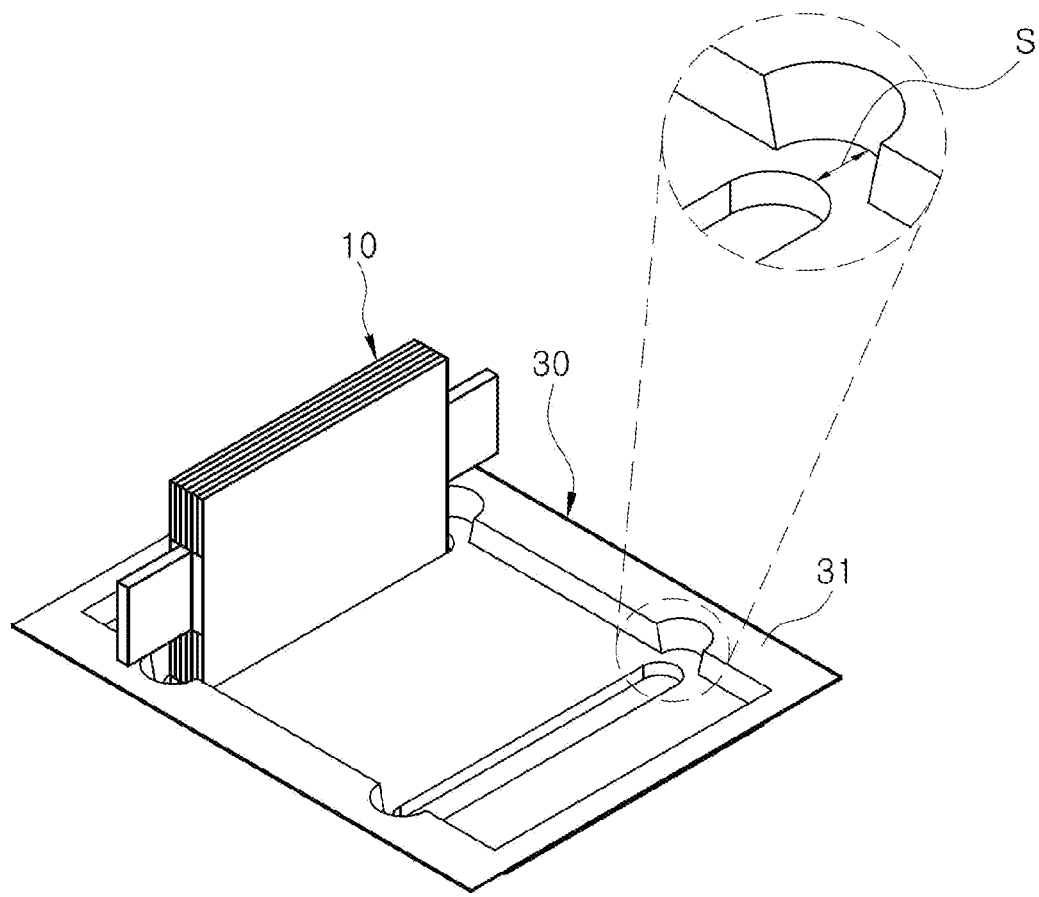
FIG. 15 is an assembled perspective view of the pouch case according to the other embodiment of the present disclosure and the electrode assembly.
Figure 16:
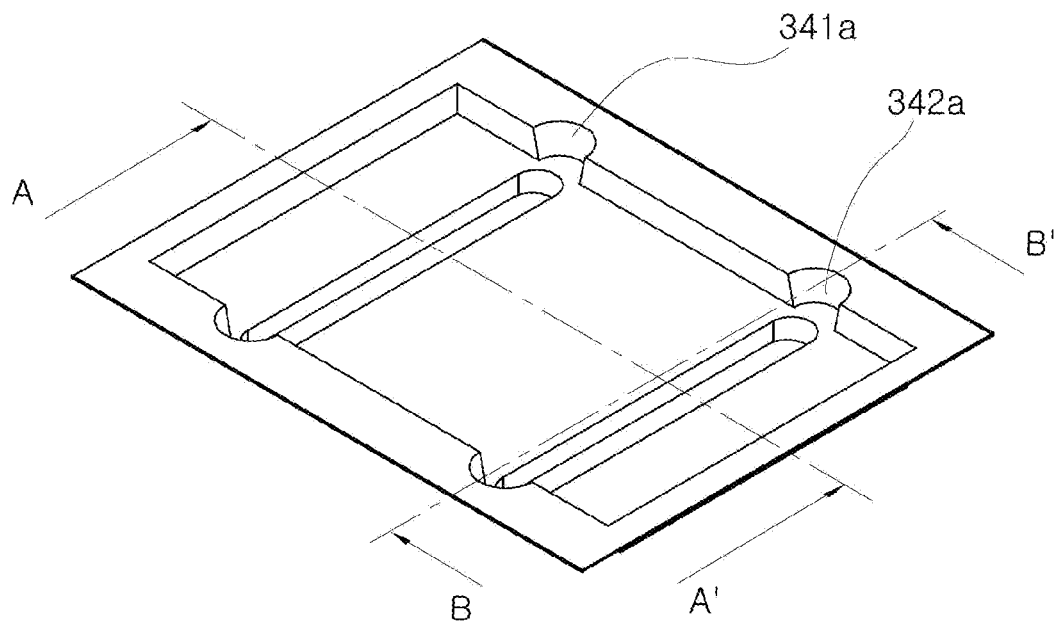
FIG. 16 is a perspective view of the pouch case according to the other embodiment of the present disclosure.
Figure 17:
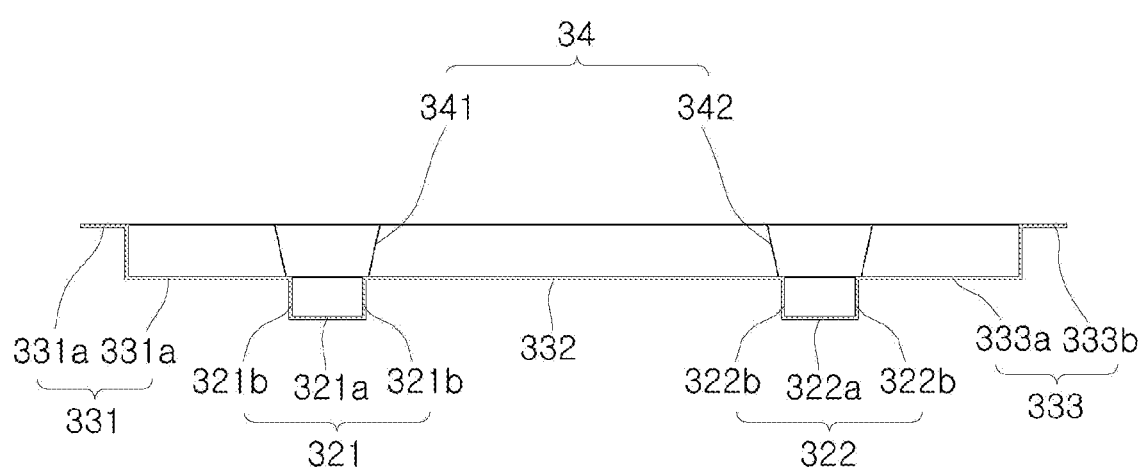
FIG. 17 is a sectional view taken along A-A' of FIG. 16.
Figure 18:
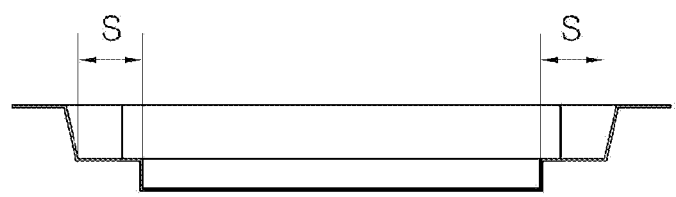
FIG. 18 is a sectional view taken along B-B' of FIG. 16.
Figure 19:
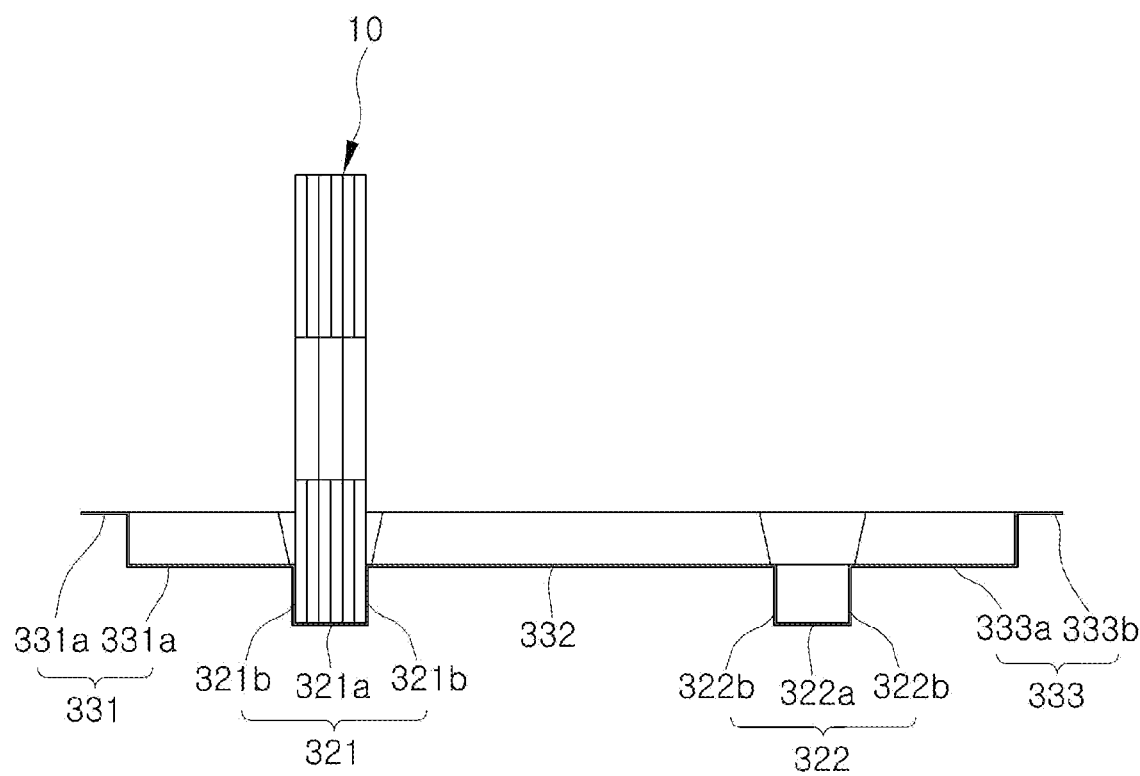
FIG. 19 is a one-side sectional view of coupling of the pouch case according to the other embodiment of the present disclosure and the electrode assembly.

FIG. 14 is an exploded perspective view of a pouch case according to another embodiment of the present disclosure and an electrode assembly; FIG. 15 is an assembled perspective view of the pouch case according to the other embodiment of the present disclosure and the electrode assembly; FIG. 16 is a perspective view of the pouch case according to the other embodiment of the present disclosure; FIG. 17 is a sectional view taken along A-A' of FIG. 16; FIG. 18 is a sectional view taken along B-B' of FIG. 16; and FIG. 19 is a one-side sectional view of coupling of the pouch case according to the other embodiment of the present disclosure and the electrode assembly.

As illustrated in FIGS. 14 to 19, the pouch case 30 according to the other embodiment of the present disclosure is configured such that a first forming portion 321 and a first notch portion 341, and a second forming portion 322 and a second notch portion 342 are arranged to be spaced apart from each other, respectively.

Other corresponding configurations and operations remain substantially the same as those of the pouch case 30 according to the embodiment of the present disclosure described above, so a redundant description will be omitted.

As illustrated in FIG. 14, the pouch case 30 according to the embodiment of the present disclosure may include: the first forming portion 321 formed in one direction to allow a first end surface of the electrode assembly 10 to be fixedly and supportedly coupled thereto; a central storing portion 332 extending from the first forming portion 321 to cover a first side surface of the electrode assembly 10; the second forming portion 322 formed in one direction by extending from the central storing portion 332 to allow a second end surface of the electrode assembly 10 to be fixedly and supportedly coupled thereto; a second receiving portion 333 extending from the second forming portion 322 to cover a portion of the second side surface of the electrode assembly 10; a first storing portion 331 extending from the first forming portion 321 to cover a remaining portion of the second side surface of the electrode assembly 10 so that the first and second storing portions 331 and 333 are joined and sealed in a direction facing each other; the first notch portion 341 spaced apart from each of opposite ends of the first forming portion 321 in one direction in the extending direction of the first forming portion 321, and adhered to a facing corresponding surface of the electrode assembly in one direction; and the second notch portion 342 spaced apart from each of opposite ends of the second forming portion 322 in one direction in the extending direction of the second forming portion 322, and adhered to a facing corresponding surface of the electrode assembly in one direction.

As illustrated in FIGS. 15 and 16, the notch portions 341 and 342 may include a first curved surface 341a and a second curved surface 342a having a predetermined curvature in a direction outwardly of the pouch case 30. However, the present disclosure is not necessarily limited to a curved shape, and various shapes and structures within a range capable of achieving the objective of the embodiment of the present disclosure may be adapted.

The first curved surface 341a and the second curved surface 342a having a predetermined curvature may effectively cover corresponding longitudinal side surfaces of the electrode assembly 10 so that a surface of the forming portion 32 in which the electrode assembly 10 is received may form a planar surface.

As illustrated in FIGS. 17 and 18, the respective first notch portions 341 are spaced apart from the opposite ends of the first forming portion 321 in one direction in which the first forming portion 321 is formed. Specifically, the first notch portion 341 may have a height difference with respect to a first bottom surface 321a of the first forming portion 321, and may be spaced apart from a first height portion 321b (see reference numeral S in FIG. 18)

As illustrated in FIG. 19, the first end surface of the electrode assembly 10 may be received and fixed to the first forming portion 321, and as the second forming portion 322 may receive and fix the second end surface of the electrode assembly 10, the pouch case 30 may seal the electrode assembly 10 so that the entire side surface of the electrode assembly 10 may be covered by the storing portion 33. A detailed description thereof remains substantially the same as the pouch case 30 according to the embodiment of the present disclosure described above, and a specific method will be described later in a method of manufacturing a secondary battery.

Figure 20:
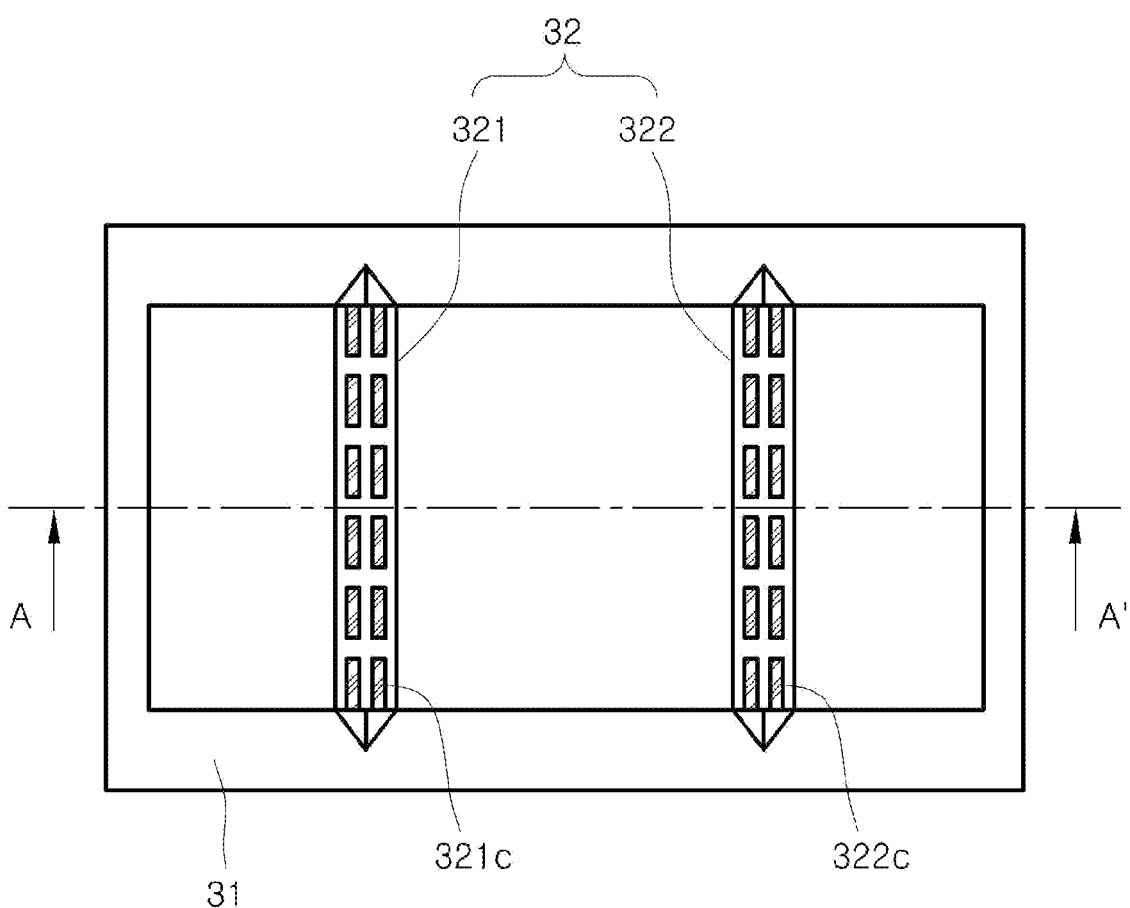
FIG. 20 is a plan view of an example of a bottom surface of a forming portion of a pouch case according to an embodiment of the present disclosure.
Figure 21:
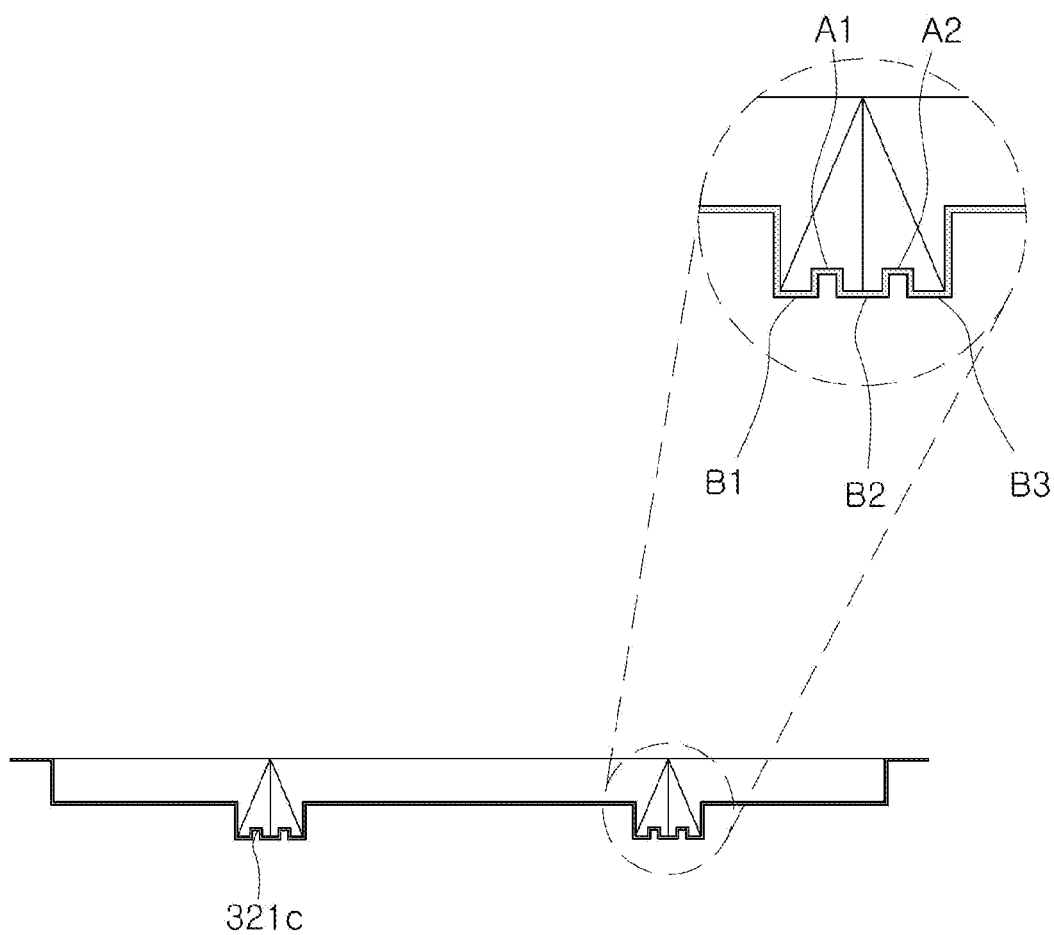
FIG. 21 is a sectional view taken along A-A' of FIG. 20.
Figure 22:
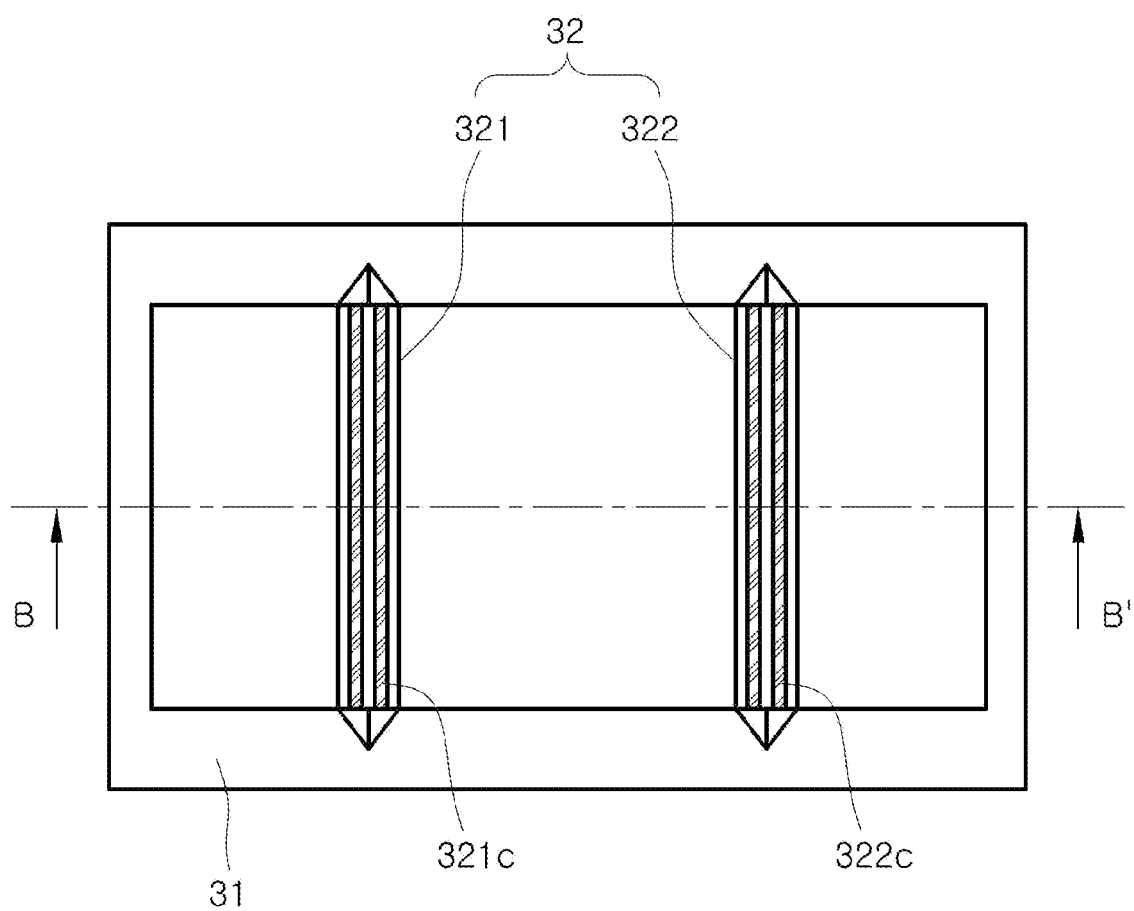
FIG. 22 is a plan view of another example of the bottom surface of the forming portion of the pouch case according to the embodiment of the present disclosure.
Figure 23:
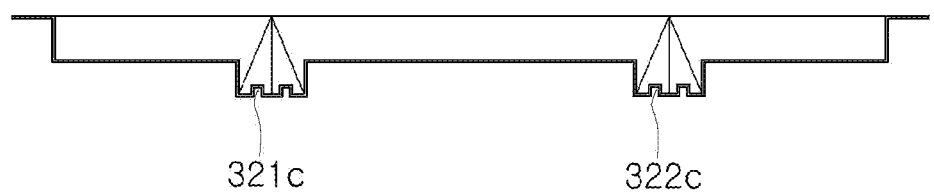
FIG. 23 is a sectional view taken along B-B' of FIG. 22.

FIG. 20 is a plan view of an example of a bottom surface of a forming portion of a pouch case according to an embodiment of the present disclosure; FIG. 21 is a sectional view taken along A-A' of FIG. 20; FIG. 22 is a plan view of another example of the bottom surface of the forming portion of the pouch case according to the embodiment of the present disclosure; and FIG. 23 is a sectional view taken along B-B' of FIG. 22.

According to the embodiment illustrated in FIGS. 20 to 23, the pouch case 30 may include a first pressing protrusion 321c and a second pressing protrusion 322c. Therefore, this may make it possible to prevent a case where in the process of simultaneously coupling and fixing a first end surface and a second end surface of an electrode assembly 10 to predetermined positions on the pouch case 30, loosening or separation occurs between the pouch case 30 and the first end surface or the second end surface of the electrode assembly 10, and, at the same time, to maintain cooling efficiency.

The first pressing protrusion 321c may protrude inwardly from a first bottom surface 321a to support the first end surface of the electrode assembly 10, and the second pressing protrusion 322c may protrude inwardly from a second bottom surface 322a to support the second end surface of the electrode assembly 10.

For example, the first and second pressing protrusions 321c and 322c may be configured as uneven portions. More specifically, as illustrated in the enlarged view of FIG. 22, each of the first pressing protrusion 321c and the second pressing protrusion 322c may be configured such that upper surfaces A1 and A2 protruding from the bottom surface and lower surfaces B1, B2, and B3, which form the bottom surface, form planar surfaces. Thereby, the pouch case 30 may secure a contact surface with the electrode assembly 10 received therein and, at the same time, may secure a contact surface with a cooling plate 50 coupled to the outside thereof, thereby effectively maintaining cooling efficiency. That is, by allowing the pouch case 30 to cover the electrode assembly 10 while physically applying predetermined pressures on upper and lower portions, i.e., the first and second end surfaces, of the electrode assembly 10 in directions facing each other, it is possible to fundamentally prevent vibration and noise due to loosening or internal separation of the electrode assembly 10 sealed in an inner space of the pouch case 30 and other risks such as electrical fires.

As illustrated in FIGS. 20 and 21, a plurality of first pressing protrusions 321c and a plurality of second pressing protrusions 322c may be arranged in parallel to be intermittently spaced apart from each other in the longitudinal directions of the first bottom surface 321a of the first forming portion 321 and the second bottom surface 322a of the second forming portion 322, respectively. In addition, as illustrated in FIGS. 22 and 23, the first pressing protrusion 321c and the second pressing protrusion 322c may be configured as integrated continuous protrusions of corresponding shapes that extend in the longitudinal directions of the first and second bottom surfaces 321a and 322a of the first forming portion 321 and the second forming portion 322, respectively.

In the first pressing protrusion 321c and the second pressing protrusion 322c illustrated herein, although the contact surfaces A1 and A2 with the electrode assembly 10 received and coupled inside the pouch case 30 and the contact surfaces B1, B2, and B3 with the cooling plate 50 coupled to the outside of the pouch case 20 are illustrated in a plan view, this physical structure can be changed appropriately according to the specifications of a product or the structure of a device.

FIGS. 24 to 28 are process diagrams of a method of manufacturing a secondary battery according to an embodiment of the present disclosure.

The method of manufacturing the secondary battery according to the embodiment of the present disclosure includes: forming a first forming portion 321 and a second forming portion 322 in a pouch case 3 to be spaced apart from each other; coupling a first end surface of an electrode assembly 10 to the first forming portion 321; coupling a central storing portion 332 between the first forming portion 321 and the second forming portion 322 to a first side surface of the electrode assembly 10 so as to cover the first side surface of the electrode assembly 10 by the central storing portion; coupling a second receiving portion 333a of a second storing portion 333 extending from the second forming portion 322 to a portion of a second side surface of the electrode assembly 10 so as to cover the portion of the second side surface of the electrode assembly 10 by the second receiving portion 333a; coupling a first receiving portion 331a of a first storing portion 331 extending from the first forming portion 321 to a remaining portion of the second side surface of the electrode assembly 10 so as to cover the remaining portion of the second side surface of the electrode assembly 10 by the first receiving portion 331a; joining a first bendable junction portion 331b at an end of the first receiving portion 331a and a second bendable junction portion 333b at an end of the second receiving portion 333a to each other; and bending a sealing joint 31a in one direction on the second side surface of the electrode assembly 10, the sealing joint resulting from the joining of the first junction portion 331b and the second junction portion 333b.

Figure 24:
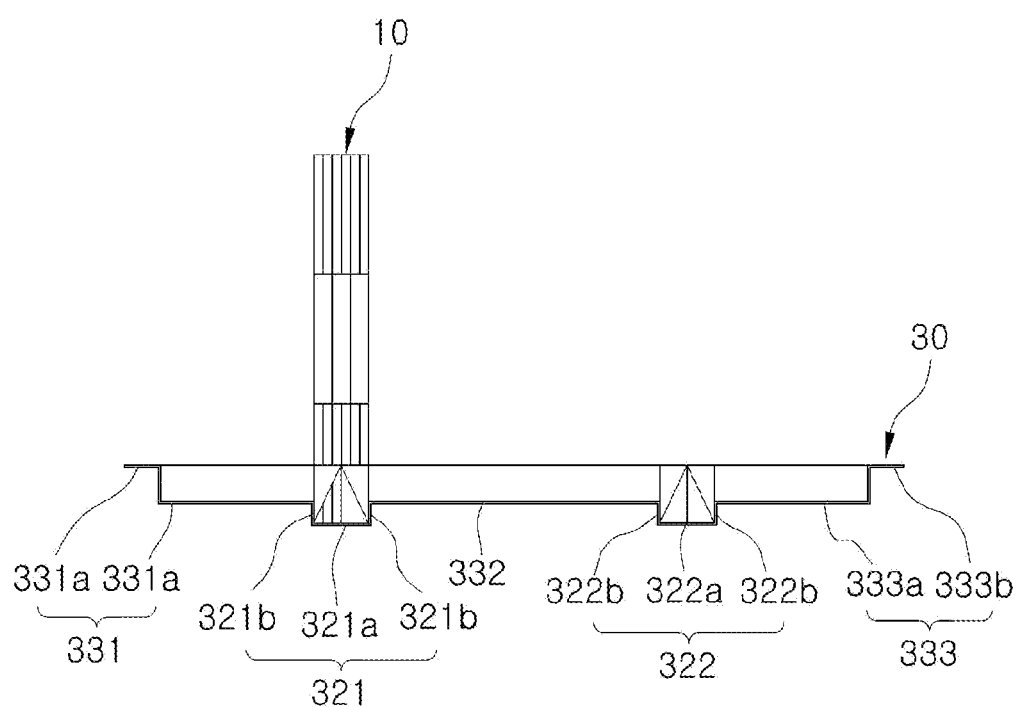
FIGS. 24 to 28 are process diagrams of a method of manufacturing a secondary battery according to an embodiment of the present disclosure.

As illustrated in FIG. 24, the first forming portion 321 and the second forming portion 322 may be formed in the pouch case 30, and the first end surface of the electrode assembly 10 may be coupled to the first forming portion 321.

Figure 25:
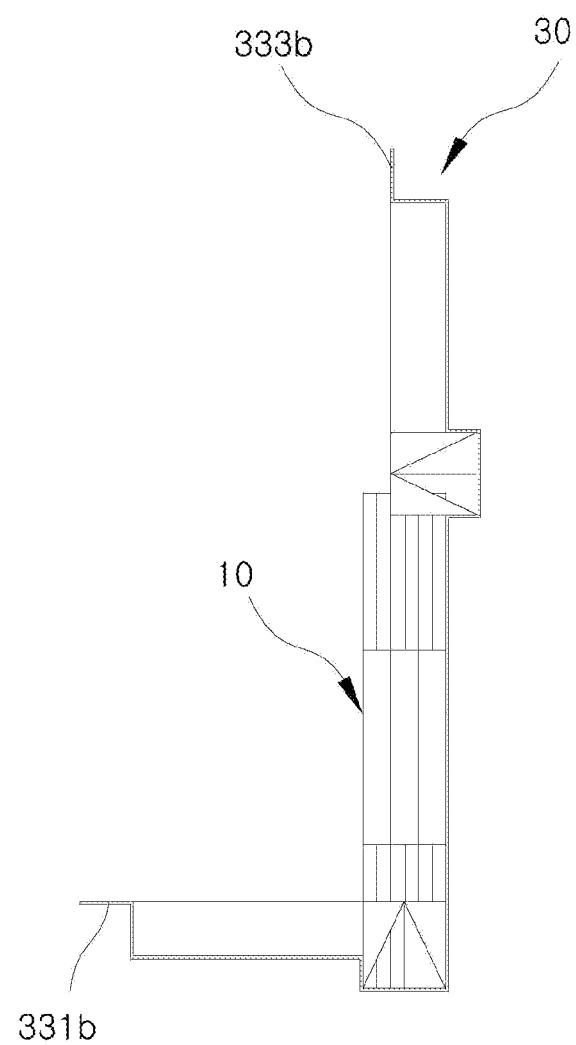

Next, as illustrated in FIG. 25, the first forming portion 321 may be coupled to the first end surface of the electrode assembly 10, and as the central storing portion 332 extending from the first forming portion 321 may receive the first side surface of the electrode assembly 10 so as to cover the first side surface, the second end surface of the electrode assembly 10 may be positioned to be coupled to the second forming portion 322.

Figure 26:
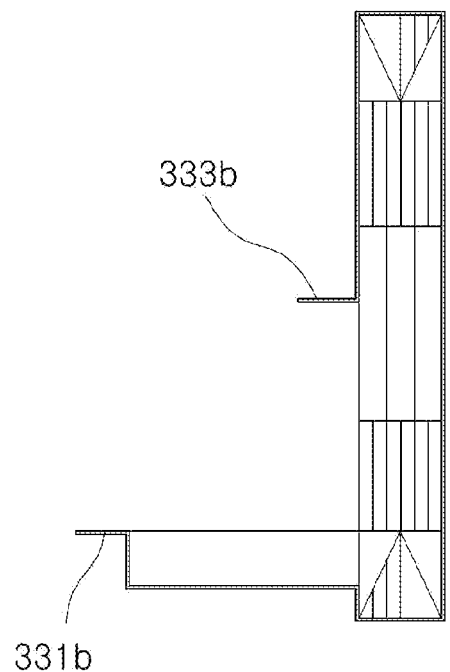
Figure 27:
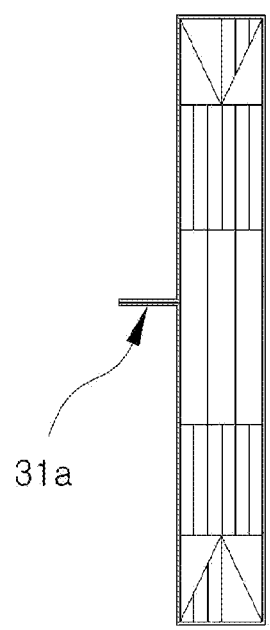

Next, as illustrated in FIGS. 26 and 27, the second receiving portion 333a of the second storing portion 333 may cover the portion of the second side surface of the electrode assembly 10 as the second end surface of the electrode assembly 10 may be received and coupled to the second forming portion 322, and the first receiving portion 331a of the first storing portion 331 may cover the remaining portion of the second side surface of the electrode assembly 10 in a direction opposite the direction in which the second receiving portion 333a covers the portion of the second side surface of the electrode assembly 10. Here, the first junction portion 331b extending from the first receiving portion 331a and bent outwardly, and the second junction portion 333b extending from the second receiving portion 333a and bent outwardly may be coupled to each other to overlap each other in opposite directions and joined to each other, thereby sealing the electrode assembly 10 in the pouch case 30 to finally seal the electrode assembly 10.

Figure 28:
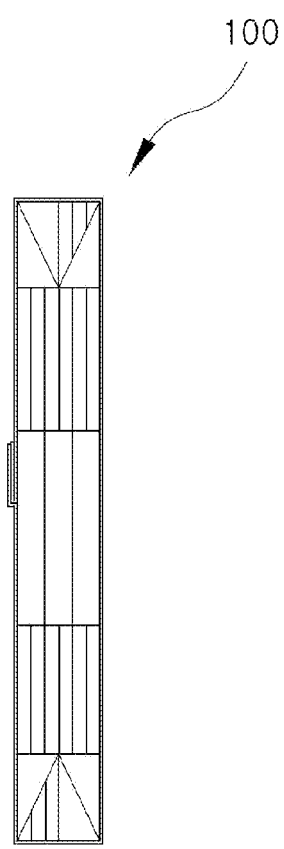

Next, as illustrated in FIG. 28, the sealing joint 31a where the first junction portion 331b and the second junction portion 333b are joined to each other may be bent in one direction, thereby minimizing the space of a stacking surface while securing an appropriate interval. This provides an effect of buffering physical deformation of the secondary battery 100 in the stacking direction. In addition, this interval may be utilized for a cooling function by inflow and outflow of air or circulation of a refrigerant, or may be utilized as a space in which an insulating material is charged to suppress thermal propagation (see FIGS. 8A and 8B).

The forming of the first forming portion 321 and the second forming portion 322 in the pouch case 30 to be spaced apart from each other may include: forming a first notch portion 341 extending from each of opposite ends of the first forming portion 321 in one direction in which the first forming portion 321 is formed, and a second notch portion 342 extending from each of opposite ends of the second forming portion 322 in one direction in which the second forming portion 322 is formed. In addition, the first notch portion 341 and the second notch portion 342 may be formed to be spaced apart from each of the opposite ends of the first forming portion 321 and each of the opposite ends of the second forming portion 322 in one direction, respectively.

In addition, in the method of manufacturing the secondary battery according to the embodiment of the present disclosure, the related configuration and operation of the pouch case 30 according to the embodiment of the present disclosure may be adapted in the same manner, so a redundant detailed description thereof will be omitted.

While the exemplary embodiments of the present disclosure have been described above, the embodiments are only examples of the disclosure, and it will be understood by those skilled in the art that the disclosure can be modified or changed in various forms without departing from the technical spirit of the disclosure. Simple modifications or changes of the present disclosure belong to the scope of the present disclosure, and the detailed scope of the present disclosure will be more clearly understood by the accompanying claims.

What is claimed is:

1. A pouch case for a secondary battery, the pouch case comprising:
a forming portion having a predetermined depth, and allowing each of a first end surface and a second end surface of an electrode assembly to be received therein;
a notch portion extending from each of opposite ends of the forming portion; and
a storing portion covering a portion of the electrode assembly that is not received in the forming portion,
wherein the forming portion comprises: a first forming portion allowing the first end surface of the electrode assembly to be received therein; and a second forming portion allowing the second end surface of the electrode assembly to be received therein,
wherein the storing portion comprises:
a central storing portion covering a first side surface of the electrode assembly between the first forming portion and the second forming portion;
a first storing portion including a first receiving portion covering a portion of a second side surface of the electrode assembly and a first junction portion extending from an end of the first receiving portion so as to be bendable; and
a second storing portion including a second receiving portion covering a remaining portion of the second side surface of the electrode assembly and a second junction portion extending from an end of the second receiving portion so as to be bendable,
wherein the first junction portion and the second junction portion are configured to be bent outwardly of the second side surface of the electrode assembly in surface contact with each other.

2. The pouch case of claim 1, wherein the first forming portion comprises:
a first bottom surface having a predetermined depth and with which the first end surface of the electrode assembly comes into contact; and a first height portion extending from the first bottom surface to support each of opposite side surfaces of the electrode assembly, and
the second forming portion comprises:
a second bottom surface having a predetermined depth and with which the second end surface of the electrode assembly comes into contact; and a second height portion extending from the second bottom surface to support each of the opposite side surfaces of the electrode assembly.

3. The pouch case of claim 2, wherein each of extension lines of the first bottom surface and the second bottom surface and an associated one of the respective notch portions form an acute angle.

4. The pouch case of claim 1, wherein the notch portion comprises:
a first notch portion extending upwardly at a predetermined angle from each of opposite ends of the first forming portion; and
a second notch portion extending upwardly at a predetermined angle from each of opposite ends of the second forming portion.

5. The pouch case of claim 1, wherein the first junction portion extends upwardly from the first receiving portion so as to have a height difference with respect to the first receiving portion, and
the second junction portion extends upwardly from the second receiving portion so as to have a height difference with respect to the second receiving portion.

6. The pouch case of claim 2, further comprising:
a first pressing protrusion protruding inwardly from the first bottom surface to support the first end surface of the electrode assembly; and
a second pressing protrusion protruding inwardly from the second bottom surface to support the second end surface of the electrode assembly.

7. A secondary battery, comprising:
an electrode assembly; and
a pouch case receiving the electrode assembly therein,
wherein the pouch case comprises:
a forming portion having a predetermined depth, and including a first forming portion allowing a first end surface of the electrode assembly to be received therein and a second forming portion allowing a second end surface of the electrode assembly to be received therein;
a notch portion extending from each of opposite ends of the forming portion or spaced apart from each of the opposite ends of the forming portion; and
a storing portion covering a portion of the electrode assembly that is not received in the forming portion,
wherein the storing portion comprises:
a central storing portion covering a first side surface of the electrode assembly between the first forming portion and the second forming portion;

a first storing portion including a first receiving portion covering a portion of a second side surface of the electrode assembly and a first junction portion extending from an end of the first receiving portion and bent outwardly of the electrode assembly; and a second storing portion including a second receiving portion covering a remaining portion of the second side surface of the electrode assembly and a second junction portion extending from an end of the second receiving portion and bent outwardly of the electrode assembly, wherein the first junction portion and the second junction portion are joined so that the first storing portion and the second storing portion surround the electrode assembly from opposite sides of the second side of the electrode assembly, and the first junction portion and the second junction portion are in surface contact with each other on the second side of the electrode assembly, and are bent in the outer direction of the other side of the electrode assembly.

8. The secondary battery of claim 7, wherein the first junction portion and the second junction portion are bent outwardly of the second side surface of the electrode assembly in surface contact with each other.

9. A secondary battery module, comprising:

at least two secondary batteries stacked in a first side surface direction, wherein the secondary batteries are arranged to be spaced apart from each other at a predetermined interval, and each of the secondary batteries comprises:

an electrode assembly; and a pouch case receiving the electrode assembly therein, wherein the pouch case comprises:

a forming portion having a predetermined depth, and including a first forming portion allowing a first end surface of the electrode assembly to be received therein and a second forming portion allowing a second end surface of the electrode assembly to be received therein;

a notch portion extending from each of opposite ends of the forming portion or spaced apart from each of the opposite ends of the forming portion; and a storing portion covering a portion of the electrode assembly that is not received in the forming portion, wherein the storing portion comprises:

a central storing portion covering a first side surface of the electrode assembly between the first forming portion and the second forming portion;

a first storing portion including a first receiving portion covering a portion of a second side surface of the electrode assembly and a first junction portion extending from an end of the first receiving portion and bent outwardly of the electrode assembly; and a second storing portion including a second receiving portion covering a remaining portion of the second side surface of the electrode assembly and a second junction portion extending from an end of the second receiving portion and bent outwardly of the electrode assembly, wherein the first junction portion and the second junction portion are joined so that the first storing portion and the second storing portion surround the electrode assembly on opposite sides of the second side surface of the electrode assembly, and the sealing joint in which the first junction portion and the second junction portion are joined so that they are in surface contact on the second side surface is bent in the outward direction of the second face of the electrode assembly, wherein the secondary batteries are stacked in the first surface direction, a predetermined interval is formed between the stacked secondary batteries by bending the sealing joint.

10. The secondary battery module of claim 9, further comprising: a cooling plate disposed on the first forming portion or the second forming portion of each of the secondary batteries.

11. The secondary battery module of claim 10, wherein the cooling plate comprises:

a first cooling plate coming into surface contact with the first forming portion; and a second cooling plate coming into surface contact with the second forming portion.

12. The secondary battery module of claim 9, further comprising:

an insulating material provided in the predetermined interval.

* * * * *